United States Patent [19]

Smith

[11] Patent Number: 5,694,602
[45] Date of Patent: Dec. 2, 1997

[54] WEIGHTED SYSTEM AND METHOD FOR SPATIAL ALLOCATION OF A PARALLEL LOAD

[75] Inventor: Bradley J. Smith, Converse, Tex.

[73] Assignee: The United States of America as represented by the Secretary of the Air Force, Washington, D.C.

[21] Appl. No.: 725,225

[22] Filed: Oct. 1, 1996

[51] Int. Cl.⁶ .................................................. G06F 15/00
[52] U.S. Cl. .................... 395/675; 395/676; 395/672; 395/800; 395/200.03; 364/281; 364/281.6; 364/281.4; 364/223; 364/222.2; 364/228
[58] Field of Search ........................ 395/675, 676, 395/672, 800, 200.03; 364/281, 281.6, 281.4, 223, 222.2, 228

Primary Examiner—Lucien U. Toplu
Assistant Examiner—Majid A. Banankhah
Attorney, Agent, or Firm—William G. Auton

[57] ABSTRACT

A method for allocating an arbitrary spatial load in two or three dimensions to an arbitrary number of parallel processing elements. The method produces as output spatial boundaries for each processor, which can then be used to redistribute the parallel computing load. Unlike existing techniques, this method allows the load to be characterized in communication time proportional to the number of dimensions and memory proportional to the number of processors in parallel. Further, this method takes as input an arbitrary number of processors, as well as an arbitrary weight for each processor, and allocates a load proportional to the processor weight to each. As a result, computing loads can be efficiently allocated to the processing elements to maximize speedup due to parallelization.

2 Claims, 1 Drawing Sheet

WEIGHTED SYSTEM AND METHOD FOR SPATIAL ALLOCATION OF A PARALLEL LOAD

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to parallel processors, and more specifically the invention pertains to a dynamically weighted method for spatial allocation of parallel loads to parallel processors that are controlled by a master processor.

Conventional methods of processor allocation generally assume that all processors have the same computational power, even though computing loads on parallel computers typically vary by 50% or more. Further, most techniques repeatedly divide the problem in two, meaning that the number of processors must be a power of the number two to achieve even load distribution, even if fewer processors will suffice. Finally, most conventional methods require that the processor allocation be done serially on a single processor. This can be prohibitively expensive, particularly for load rebalancing, since the entire computing load must be moved to one processor before allocation can proceed.

The task of load balancing the problems solved by parallel processors is alleviated, to some extent by the systems disclosed in the following U.S. Patents, the disclosures of which are incorporated herein by reference:

U.S. Pat. No. 4,400,768 issued to Tomlinson; and

U.S. Pat. No. 4,920,487 issued to Baffles.

Most parallel load balancing is static in nature, with very few methods extending to dynamic allocation techniques. What is needed is a system that is able to dynamically load balance while taking actual processor (node) speed into account. The present invention is intended to satisfy this need.

SUMMARY OF THE INVENTION

The present invention includes a system and a method for allocating an arbitrary spatial load in two or three dimensions to an arbitrary number of parallel processing elements. The method produces as output spatial boundaries for each processor, which can then be used to redistribute the parallel computing load. This is best described as a six-step process which is summarized below by a single master processor to perform some centralized allocation tasks, but the load characterization is done in parallel on all processors:

1. Create an allocation structure consisting of a set of spatial boundaries, and set of processors assigned this area of space. Initially create a single structure whose bounds are the problem boundaries containing all N processors on our master processor. Next for each major axis (dimension) repeat the following steps:

2. For each active allocation structure (on the master processor), create D√N columns of processors (D=number of dimensions in problem) along the current axis. For each column of processors, total the weight W[i] from individual columns of processors to form a column weight C[j]. Also total all of the column weights to get an overall total weight Tweight.

3. Pass the boundaries of each active allocation structure to each processor. Have each processor generate loading counts for each allocation structure along the active axis as follows:

An array of counts is created and initialed to zero. The size of the counts array depends on the resolution of allocation desired 1000–20000 counts are sufficient for most applications, since counts are applied in each dimension.

The computing load is characterized along the current axis using the counts array. Most often this is done by serially walking the computed elements (particles, points in a computing grid, equations to be computed spatially, or number of data elements in a database) and incrementing the count that spatially corresponds to this element along the current axis. Note that only the counts for the allocation structure that currently contains the element being considered must be incremented. This takes at most (K) time for K elements on a node.

4. Next the counts that were locally gathered in step three are consolidated using message passing on a single processor. Counts for each allocation structure are joined by simply adding corresponding elements of the counts array. When this step is complete, our master processor contains a counts array for each allocation structure that effectively characterizes the current load for that space across all processors.

5. Now the master processor uses a simple iterative technique to create new allocation structure that divide each current allocation structure into columns so that each column contains a load proportional to the weight of the processors assigned to the column. Specifically for each current allocation structure, perform the following steps:

Total the counts for this allocation structure to get a total count called Tcount.

For each column of processors (determined in step 2), calculate the desired count as the column weight C[j] times the total count Tcount divided by the total overall weight Tweight.

Using an index I, and a sum S initialized to zero, iterate through the counts array, summing the counts. When the sum S is equal to or exceeds the desired count for the current column J, create a new allocation structure representing the column with spatial coordinates bounded by the last and current space corresponding to the current counts. This will divide the current allocation structure into weighted columns where the load in the column is approximately proportional to the relative weights for processors in the column.

6. Finally, using the newly created allocation structures (columns), repeat the above process beginning with step 2 above for all remaining dimensions. For a three dimensional problem, this will mean a total of three iterations of the above process. The only change to the above process is that in the final iteration, step 2, each allocation structure is divided into a number of columns equal to the number of remaining processors assigned to the allocation structure rather than columns. This is required to handle an arbitrary number of processors.

It is an object of the present invention to achieve the optimal weighted allocation of N processors, corresponding to the spatial bounds of each processor.

It is another object of the present invention to allocate an arbitrary spatial computational load to an arbitrary number of weighted parallel processing elements. The invention performs this allocation in such a way that each processing element receives a spatial portion of the computing load that is proportional to its weight. As a result, an arbitrary spatial load may be efficiently allocated to an arbitrary number of weighted processing elements for efficient parallel computing.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

The sole figure of the drawings is FIG. 1, which is a block diagram of a parallel processor system of the present invention.

DETAILED DESCRIPTION OF THE PREFERRED EMBODIMENT

Figure 1:
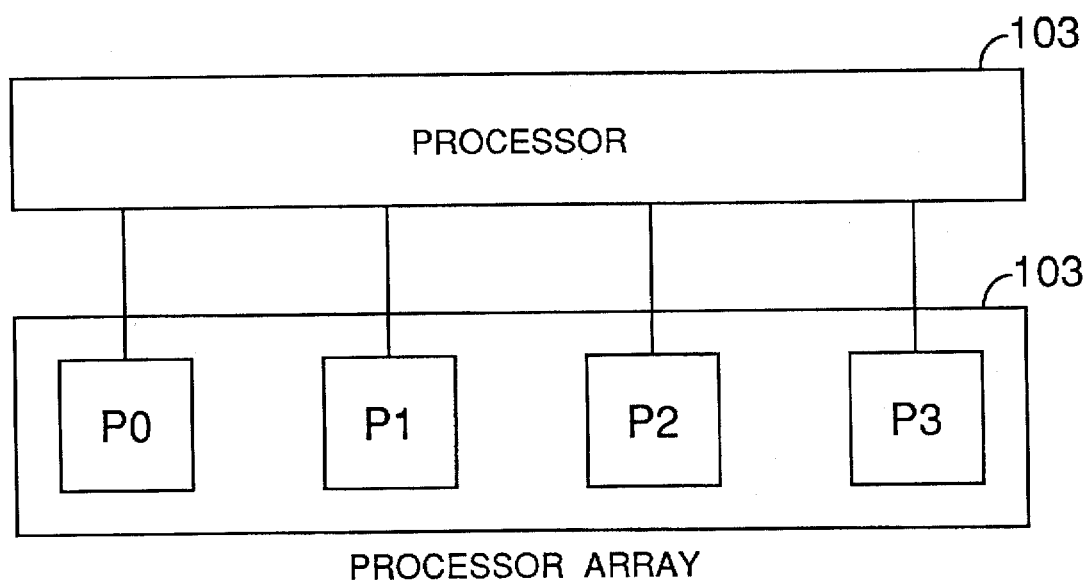

The present invention includes a system and a method for allocating an arbitrary spatial load in two or three dimensions to an arbitrary number of parallel processing elements. The method produces as output spatial boundaries for each processor, which can then be used to redistribute the parallel computing load. Unlike existing techniques, this method allows the load to be characterized in communication time proportional to the number of dimensions and memory proportional to the number of processors in parallel. Further, this method takes as input an arbitrary number of processors, as well as arbitrary weight for each processor, and allocates a load proportional to the processor weight to each. As a result, computing loads can be efficiently allocated to the processing elements to maximize speedup due to parallelization.

The reader's attention is now directed towards FIG. 1, which is a block diagram of a parallel processor computer system that uses the present invention. The system of FIG. 1 includes a master processor 100, to allocate tasks to a parallel processor array 103 of N parallel processors P0–P3. When the master processor 100 is programmed with the source code of Table 1, it uses a dynamic weighted method for spatial allocation of parallel loads to parallel processors.

The purpose of this invention is to allocate an arbitrary spatial computational load to an arbitrary number of weighted parallel processing elements. The invention performs this allocation in such a way that each processing element receives a spatial portion of the computing load that is proportional to its weight. As a result, an arbitrary spatial load may be efficiently allocated to an arbitrary number of weighted processing elements for efficient parallel computing.

This description assumes a Multiple Instruction Multiple Data (MIMD), distributed memory parallel processing model with a generic message passing architecture. This invention could easily be converted to run on a Single Instruction Multiple Data (SIMD) shared memory model by replacing message passing references with shared memory accesses. We assume MIMD distributed memory and message passing, as this is generally the more challenging of the two primary parallel computing models to efficiently implement.

Conventional methods of processor allocation generally assume that all processors have the same computational power, even though computing loads on parallel computers typically vary by 50% or more. Further, most techniques repeated divide the problem in two, meaning that the number of processors must be a power of the number two to achieve even load distribution, even if fewer processors will suffice. Finally, most conventional methods require that the processor allocation be done serially on a single processor. This can be prohibitively expensive, particularly for load rebalancing, since the entire computing load must be moved to one processor before allocation can proceed.

As an example, consider the Orthogonal Recursive Bisection Algorithm (ORB), commonly used for parallel load allocation. The ORB method starts by dividing the problem space in two along a line calculated to split the load in half in one dimension. It then recursively repeats this process on the two halves, forming four rectangles with approximately the same load. By the repeatedly dividing these quarters, the ORB algorithm can create areas for any number of processors that is a power of two. Note that the ORB method does not allow for arbitrary weighting or an arbitrary number of processors.

This invention requires an arbitrary set of N processing elements connected by a network capable of performing basic message passing. It also requires a positive weight $W[i]$ for each processing element that characterizes the relative speed of the processor. Portions of the problem will be allocated in proportion to the weight of each processor, with larger weights getting a larger portion of the problem. The problem to be allocated must be able to be allocated spatially. Note that spatial allocation need not indicate a real physical dimension, but could represent a nonphysical dimension, such as the keys in a database. Fortunately the class of spatially divisible problems is large. Examples of problems that can be divided and allocated spatially include most Lagrangian and Eularian numerical codes, database tables, which may be divided in one dimension by row or key, virtually any graphic or rendering problem, and many data gathering and analysis problems. Finally, the problem load must be characterizable in each of its spatial dimensions. For example, a simple numerical code might use the number interpolation points or cells in space to characterize the computing lad. A database might use the number of records. For a graphical problem, the number of items to be rendered in a given space, or number of non-background pixels in an image might be used as the load measure.

Given a problem with the above characteristics, one can apply the following method to achieve the optical weighted allocation of N processors. Output will be a set of rectangular or cubic boundaries corresponding to the spatial bounds of each processor. We use a single master processor to perform some centralized allocation tasks, but the load characterization is done in parallel on all processors:

1. Create an allocation structure consisting of a set of spatial boundaries, and set of processors assigned this area of space. Initially create a single structure whose bounds are the problem boundaries containing all N processors on our master processor. Next for each major axis (dimension) repeat the following steps:

2. For each active allocation structure (on the master processor), create $D\sqrt{N}$ columns of processors (D=number of dimensions in problem) along the current axis. For each column of processors, total the weight $W[i]$ from individual columns of processors to form a column weight $C[j]$. Also total all of the column weights to get an overall total weight Tweight.

3. Pass the boundaries of each active allocation structure to each processor. Have each processor generate loading counts for each allocation structure along the active axis as follows:

An array of counts is created and initialized to zero. The size of the counts array depends on the resolution of allocation desired. 1000–2000 counts are sufficient for most applications, since counts are applied in each dimension.

The computing load is characterized along the current axis using the counts array. Most often this is done by serially walking the computed elements (particles, points in a computing grid, equations to be computed spatially, or number of data elements in a database) and incrementing the count that spatially corresponds to this element along the current axis. Note that only the counts for the allocation structure that currently contains the element being considered must be incremented. This takes at most O(K) time for K elements on a node.

4. Next the counts that were locally gathered in step three are consolidated using message passing on a single processor. Counts for each allocation structure are joined by simply adding corresponding elements of the counts array. When this step is complete, our master processor contains a counts array for each allocation structure that effectively characterizes the current load for that space across all processors.

5. Now the master processor uses a simple iterative technique to create new allocation structures that divide each current allocation structure into columns so that each column contains a load proportional to the weight of the processors assigned to the column. Specifically for each current allocation structure, perform the following steps:

Total the counts for this allocation structure to get a total count called Tcount.

For each column of processors (determined in step 2), calculate the desired count for the current column J, create a new allocation structure representing the column with spatial coordinates bounded by the last and current space corresponding to the current counts. This will divide the current allocation structure into weighted columns where the load in the column is approximately proportional to the relative weights for processors in the column.

6. Finally, using the newly created allocation structures columns), repeat the above process beginning with step 2 above for all remaining dimensions. For a three dimensional problem, this will mean a total of three iterations of the above process. The only change to the above process is that in the final iteration, step 2, each allocation structure is divided into a number of columns equal to the number of remaining processors assigned to the allocation structure rather than D$\sqrt{N}$ columns. This is required to handle an arbitrary number of processors.

As mentioned previously, most existing load balancing methods attempt to evenly distribute the load to all processors by assuming that all processors are equal. As a result, these existing methods typically run as fast as the slowest processor on the parallel machine. Because most modern parallel computers and all workstation networks are multi-tasking systems, processor speeds due to varying load on homogeneous parallel computers can vary by 100% or more. By properly weighting the load on each processor according to the relative processor speed, one can take advantage of the extra capacity available on some timeshared nodes to enhance performance. What is unique about this particular method for dynamic processor allocation is that it allows the problem to be efficiently characterized in parallel, and then dynamically allocated in proportion to processor weight. Further, the allocation is accomplished in a constant number of communications steps, the largest of which is less than the total number of processors. This allows for very efficient load balancing, since the load can be optimally allocated to faster and slower processors without excess communication or memory overhead. We have demonstrated identical problems running 30% faster using this load balancing method on the homogeneous IBM SP-1 parallel computer and up to 50% faster on heterogeneous groups of workstations. This method was demonstrated on a free-Lagrangian Smooth Particle Hydrocode, using nearly half a million irregularly distributed particles.

Variations are possible. Our initial, non-optimal implementation of this method performed a single characterization of the problem in all three dimensions, allowing the problem to be characterized and allocated in a single communications step. Unfortunately, this non-optimal implementation could not properly handle some large irregular load distributions. The current implementation included here very closely approximates an optimal distribution, within the limits of the ability to discriminate counts in each dimension. Note, however, that since some problems are initialized with computed points arranged in a plane along one or more dimensions, slight irregularities in final distribution may exist. Also, the resolution of the counts array used to characterize the load may not be sufficient to allow for resolution of some densely populated spaces. We believe this could be mitigated by allowing for variations in the rectangular or cubic boundaries output from this model. For example, allowing each processor to control a volume described by two or more adjacent boxes or rectangles would let us split planes of contiguous data. Since the existing method has been sufficient for our relatively fine-grained application, we have not yet experimented with these extensions.

This method is particularly effective when tied to an efficient processor weighting method. If the method for weighting the processors efficiently evaluates processor performance and assigns a proper weight as input to this method, large efficiency gains can be made on networks of timeshared computers.

The method described above is implemented when the source code of Table 1 is loaded into the controlling processor of a network of parallel processors. Suitable parallel processing networks are described in the above-cited Baffles and Tomlinson patents.

As mentioned above, the present invention describes a method for allocating an arbitrary spatial load in two or three dimensions to an arbitrary number of parallel processing elements. The method produces as output spatial boundaries for each processor, which can then be used to redistribute the parallel computing load. While prior art systems generally use static load balancing, the present invention uses dynamic allocation techniques.

While the invention has been described in its presently preferred embodiment it is understood that the words which have been used are words of description rather than words of limitation and that changes within the purview of the appended claims may be made without departing from the scope and spirit of the invention in its broader aspects.

TABLE 1

```c
/* Partitioning algorithms for PIC
 * Bradley Smith, PL/WSC
 * 18 Dec 94
 */ include "all.h"

int JustBalanced;

/* Total weight to allocate between processors */
int TotWeight;

int cube_root _proto((int n));

#ifndef DIM
#define DIM 3
#endif

/* Partition problem space (bounds) into (nproc) pieces
 * using algorithm (type).  Put results into (prob->partitions).
 */
int
PartitionProblem(prob, nproc, bounds, type, neighbor_overlap, reallocate)
 PProblem prob;
 int nproc;
 PRect bounds;
 int type;
 PPoint neighbor_overlap;
 int reallocate;
{
 int ret;
 int i;

/* Create partitions list */
 if(prob->partitions == NULL)
        {
        prob->partitions = (PShape *) New(sizeof(PShape) * nproc);

/* Fill in allocation structures */
        prob->palloc.start_time = GetCurTime();
        prob->palloc.accum_time = 10L;
        prob->palloc.last_loadbal = 0;
        prob->palloc.weights = (long *) New(sizeof(long) * NProc);
        prob->palloc.pweights = (long *) New(sizeof(long) * NProc);
        prob->palloc.Bound = (PRect) New(sizeof(Rect) * NProc);
        prob->palloc.bal_step_threshold = MP_GetConfigInt("Partition",
                "min_bal", 50, Config);
        prob->palloc.force_bal_step = MP_GetConfigInt("Partition",
                "max_bal", 1000, Config);
        prob->palloc.dev_threshold = MP_GetConfigInt("Partition", "bal_threshold",
                200, Config);

/* Threshold for load balancing */

/* Default to Z axis partitioning */
        prob->palloc.major_axis = MP_GetConfigInt("Partition", "axis", 2, Config);

/* Initialize weights */
        for(i=0; i<NProc; i++)
                prob->palloc.weights[i] = prob->palloc.pweights[i] = 1000L;
        }

/* Default partitioning */
if(NProc <= 1)
        {
                                 13
```

```
                prob->partitions[0] = NewBox(NULL, bounds, NULL);
                }
        else switch(type)
                {
                case PARTITION_SMITH_TYPE:
                        ret = PartitionSmith(prob, nproc, bounds, reallocate);
                        break;
                default:
                case PARTITION_Z_TYPE:
                        /* Don't repartition static case */
                        if(reallocate == REALLOCATE)
                                return(TRUE);
                        ret = PartitionZ(prob, nproc, bounds);
                        break;
                }

/* Calculate neighbors and overlap */
        CalculateNeighbors(prob, nproc, neighbor_overlap);

return(ret);
}

/* Simplest partitioning - 1-D partition in Z direction
 */
int
PartitionZ(prob, nproc, bounds)
 PProblem prob;
 int nproc;
 PRect bounds;
{
 Rect r;
 int i;
 FLOAT dz;

PartitionDebug("Part: Partitioning bounds (%f,%f,%f) to (%f,%f,%f)\n",
        bounds->rmin.x, bounds->rmin.y, bounds->rmin.z,
        bounds->rmax.x, bounds->rmax.y, bounds->rmax.z);

/* Currently just use the dumb algorithm - split on Z axis */
 r = *bounds;
 dz = (bounds->rmax.z - bounds->rmin.z)/nproc;

for(i=0; i<nproc; i++)
        {
        r.rmin.z = bounds->rmin.z + (dz * i);
        r.rmax.z = bounds->rmin.z + (dz * (i+1));

/* Set this processor to these bounds */
        PartitionDebug("Part: Creating partition (%f,%f,%f) to (%f,%f,%f)\n",
           r.rmin.x, r.rmin.y, r.rmin.z, r.rmax.x, r.rmax.y, r.rmax.z);
     prob->partitions[i] = NewBox(NULL, &r, NULL);
        }

PartitionDebug("Part: Done partitioning problem\n");
 return(TRUE);
} int
CalculateNeighbors(prob, nproc, overlap)
 PProblem prob;
 int nproc;
 PPoint overlap;
{
 PRect mybounds, pr, pintersect;
 Rect r;
```

```
    int i;

PartitionDebug("Part: Recalculating Neighbors\n");

/* First recalculate all neighbors of us */
    /* Get bounds for us */
    mybounds = GetShapeBounds(prob->partitions[Rank]);
    prob->nneighbor = prob->nsend = 0;

/* Next find all rectangles that intersect us */
    for(i=0; i<NProc; i++)
            if(i != Rank)
                    {
                    /* Get other processor's bounds and copy it */
                    pr = GetShapeBounds(prob->partitions[i]);
                    r  = *pr;

/* Increase bounds by cell overlap size */
                    ExpandRect(&r, overlap);

/* Compute intersection */
                    pintersect = IntersectRect(&r, mybounds);
                    if(!IsNullRect(pintersect))
                            {
                            /* Keep neighbor's id */
                            prob->neighbors[prob->nneighbor] = i;

/* Intersection - this is a neighbor */
                            prob->neighbor_bounds[prob->nneighbor++] = *pr;

/* And the intersection becomes my send area */
                            prob->send_bounds[prob->nsend++] = *pintersect;
#ifdef NOTDEF
                            PartitionDebug(
                                    "PartDebug: Send Bounds[%d]=(%g,%g,%g) to (%g,%g,%g)\n",
                                    prob->neighbors[prob->nsend-1],
                                    pintersect->rmin.x, pintersect->rmin.y, pintersect->rmin.z,
                                    pintersect->rmax.x, pintersect->rmax.y, pintersect->rmax.z);
#endif

}
                    } return(TRUE);
    }

/* Use Brad Smith's algorithm for 3-D partitioning based on
     *  dimensional counts
     */
    int
    PartitionSmith(prob, nproc, bounds, reallocate)
     PProblem prob;
     int nproc;
     PRect bounds;
     int reallocate;
    {
     PAllocStruct al;
     int i,n;

if(Rank == 0 && reallocate == REALLOCATE)
            MP_Log("Load balancing nproc=%d\n", nproc);
     PartitionDebug("Part: Partitioning bounds (%f,%f,%f) to (%f,%f,%f)\n",
            bounds->rmin.x, bounds->rmin.y, bounds->rmin.z,
            bounds->rmax.x, bounds->rmax.y, bounds->rmax.z);
```

15

```
/* Child processes simply send counts and begin exchanging allocations */
if(Rank > 0)
        {
        if(reallocate==REALLOCATE)
                GenSlaveCounts(prob, reallocate);
        ExchangeProcessorAllocations(prob, NULL);
        return(TRUE);
        }

/* Set up initial allocation structures */
al = (PAllocStruct) New(sizeof(AllocStruct));
al->min_proc = 0;
al->max_proc = NProc;
al->bound = *bounds;
al->next = NULL;

/* Begin by calculating number of procs per dimension */
n = cube_root(NProc);

PartitionDebug("Part: n=%d, calling SubAlloc first time\n",n);

/* Create divisions along non-major axis */
SubAlloc(prob, reallocate, al, n, !prob->palloc.major_axis);

PartitionDebug("Part: n=%d, calling SubAlloc second time\n",n);
SubAlloc(prob, reallocate, al, n, (prob->palloc.major_axis == 2)?1:2);

PartitionDebug("Part: n=%d, calling SubAlloc third time\n",n);
/* Create divisions along major axis */
SubAlloc(prob, reallocate, al,n,prob->palloc.major_axis);

/* Exchange allocations */
ExchangeProcessorAllocations(prob, al);

return(TRUE);
} void
GenSlaveCounts(prob, reallocate)
PProblem prob;
int reallocate;
{
int dim, i;
int zero=0;
int nal, axis;
PAllocStruct pal, al, nextal;

for(dim=0; dim< DIM; dim++)
        {
        /* Receive number of allocations and axis we are working on */
        MP_BRecvBuf(NULL, zero, COUNT_HDR_TAG);
        MP_Unpack(NULL, &nal, 1, MP_INT, 1);
        MP_Unpack(NULL, &axis, 1, MP_INT, 1);

pal = NULL;
        /* Receive the actual count vectors */
        MP_BRecvBuf(NULL, zero, COUNT_TAG);
        for(i=0; i<nal; i++)
                {
                al = (PAllocStruct) New (sizeof(AllocStruct));
                MP_Unpack(NULL, &al->bound.rmin, 3, MP_FLOAT, 1);
                MP_Unpack(NULL, &al->bound.rmax, 3, MP_FLOAT, 1);

/* Form a list of counts */
                al->next = pal;
```

```
                    pal = al;
                    }

/* Generate our local counts */
        GenLocalCounts(prob, pal, axis, reallocate);

/* Now send counts generated locally back to node zero*/
        MP_Pack(NULL, &TotWeight, 1, MP_INT, 1);
        for(al = pal; al!= NULL; al= nextal)
            {
            nextal = al->next;
#ifdef NOTDEF
            PartitionDebug("Sending counts back to zero\n");
#endif
            /* Send count vector back to node zero */
            MP_Pack(NULL, al->count, PALLOC_RES, MP_INT, 1);
            MP_BSendBuf(NULL, &zero, 1, COUNT_TAG);

/* Free it */
            Delete(al);
            }
        }
}

/* Allocate from one structure to others */
void
SubAlloc(prob, reallocate, al, n, axis)
 PProblem prob;
 int reallocate;
 PAllocStruct al;
 int n;
 int axis;
{
 PAllocStruct pal;
 int nal;
 int i,j,k;
 int first, num, count;

/* Walk our list */
TotWeight = 0;

/* Count the number of allocations */
nal=0;
for(pal = al; pal != NULL; pal=pal->next)
    {
    nal ++;
    /* Mark this allocation not yet done */
    pal->done = FALSE;
    }

PartitionDebug("Generating local counts nal=%d\n", nal);
/* Generate local counts for node zero */
GenLocalCounts(prob, al, axis, reallocate);

if(reallocate == REALLOCATE)
    {
    /* Send each processor the number of allocations and current axis */
    MP_Pack(NULL, &nal, 1, MP_INT, 1);
    MP_Pack(NULL, &axis, 1, MP_INT, 1);
    MP_BSendBuf(NULL, MP_BROADCAST, NProc-1, COUNT_HDR_TAG);

/* Pack the counts for other processors */
    for(pal = al; pal != NULL; pal=pal->next)
            {
            /* Pack the relavent information to send to others */
```

```
                    MP_Pack(NULL, &pal->bound.rmin, 3, MP_FLOAT, 1);
                    MP_Pack(NULL, &pal->bound.rmax, 3, MP_FLOAT, 1);
            }
            MP_BSendBuf(NULL, MP_BROADCAST, NProc-1, COUNT_TAG);

/* Now gather the counts calculated by each proc */
            for(i=1; i<NProc; i++)
            {
                    first=TRUE;
                    for(pal = al; pal != NULL; pal=pal->next)
                    {
                            /* Receive counts */
                            MP_BRecvBuf(NULL, i, COUNT_TAG);

PartitionDebug("Received counts from %d\n",i);
                            /* First message also contains overall count */
                            if(first)
                            {
                                    MP_Unpack(NULL, &count, 1, MP_INT, 1);
                                    TotWeight += count;
                                    first=FALSE;
                            }

/* Unpack counts from this processor */
                            for(k=0; k<PALLOC_RES; k++)
                            {
                                    MP_Unpack(NULL, &count, 1, MP_INT, 1);
                                    pal->count[k] += count;
                            }
                    }
            }

/* Now do the actual partitioning */
            for(pal = al; pal != NULL; pal=pal->next)
            {
                    if(!pal->done)
                    {
                            PartitionAllocation(prob, pal, n, axis);
                    }
            }
    } void
ExchangeProcessorAllocations(prob, pal)
  PProblem prob;
  PAllocStruct pal;
{
 int i;
 FLOAT temp;
 PAllocStruct nextal;

/* Share processor allocations */
if(NProc > 1)
    {
    if(Rank == 0)
        {
                /* Copy allocation into our structure */
                for(; pal!= NULL; pal = nextal)
                {
                        nextal = pal->next;
                        PartitionDebug("Proc bounds for %d are (%f,%f, %f) to (%f,%f, %f)\n",
                            pal->min_proc, pal->bound.rmin.x, pal->bound.rmin.y, pal->bo
                                 pal->bound.rmax.x, pal->bound.rmax.y, pal->bound.rma:
                        prob->palloc.Bound[pal->min_proc] = pal->bound;
```

```
                    Delete(pal);
            }
                /* Pack number of particles */
        MP_Pack(NULL, &prob->TotWeight, 1, MP_INT,1);
        for(i=0; i<NProc; i++)
            {
                        /* Pack allocations */
                    MP_Pack(NULL, &prob->palloc.Bound[i], 6, MP_FLOAT, 1);
            }
        /* Send processor allocations to others */
        MP_BSendBuf(NULL, MP_BROADCAST, NProc - 1, PROC_ALLOC_TAG);
        }
    else
        {
                /* Receive counts from others */
        MP_BRecvBuf(NULL, 0, PROC_ALLOC_TAG);
        MP_Unpack(NULL, &prob->TotWeight, 1, MP_INT, 1);

for(i=0; i<NProc; i++)
            {
                        MP_Unpack(NULL, &prob->palloc.Bound[i], 6, MP_FLOAT, 1);
            }
        }

/* Now create shapes for processors */
    for(i=0; i<NProc; i++)
            prob->partitions[i] = NewBox(NULL, &prob->palloc.Bound[i], NULL);
} void
PartitionAllocation(prob, al, n, axis)
 PProblem prob;
 PAllocStruct al;
 int n;
 int axis;
{
 int nproc;
 long tot_weight, weight;
 int npart, tot_part;
 int count_part;
 int i,j,k;
 int rem;
 int col_ptr;
 PAllocStruct new_al;
 int start;
 int n_per_col;

nproc = al->max_proc - al->min_proc;

if(nproc <= 1)
        return;

#if !defined(ORB)
 /* Allocate all remaining processors if this is the major axis */
 if(axis == prob->palloc.major_axis)
        n = nproc;

/* Decide if we need to divide this */
 if(n <= 1)
        return;
```

```
/* Compute allocation totals */
tot_weight = 0L;
for(i=al->min_proc; i<al->max_proc; i++)
    {
    tot_weight += prob->palloc.weights[i];
    }

/* Total particles we have to work with */
tot_part = 0;
for(i=0; i<PALLOC_RES; i++)
    {
    tot_part += al->count[i];
    }

/* Compute remainder */
rem = nproc % n;

PartitionDebug("tot_weight=%ld tot_count=%d rem=%d\n", tot_weight, tot_part, rem);

n_per_col = nproc/n;

/* Allocate individual columns */
k=al->min_proc;
start = 0;
col_ptr = 0;
for(i=0; i<n; i++)
    {
    /* Total the weight for the column */
    weight=0;
    for(j=k; j<k+((i<rem)?n_per_col+1:n_per_col); j++)
        {
        weight += prob->palloc.weights[j];
        }
    /* Determine target number of particles for column */
    npart = (int)((FLOAT)tot_part * (FLOAT)weight/(FLOAT)tot_weight);

PartitionDebug("Target count for %d is %d weight=%d\n", i, npart, weight);

/* Actually walk to create the columns */
    count_part = 0;
    for(; col_ptr < PALLOC_RES; col_ptr++)
        {
        count_part += al->count[col_ptr];
        if(count_part >= npart)
            break;
        /* Do a random check of the boundary when we are close to it! */
        if(rand() % 2 && col_ptr < PALLOC_RES-1 && count_part+al->count[col_ptr+1] >
            break;
        }
    /* Assign the column to a new alloc record */
    new_al = (PAllocStruct) New(sizeof(AllocStruct));
    new_al->done = TRUE;
    new_al->bound = al->bound;
    new_al->min_proc = k;
    k += (i < rem)? n_per_col+1:n_per_col;
    new_al->max_proc = k;
    /* Check to see if this is the last column */
    if(new_al->max_proc == al->max_proc)
        col_ptr = PALLOC_RES-1;
    switch(axis)
        {
        case 0:
            new_al->bound.rmin.x = ((FLOAT)start/(FLOAT)PALLOC_RES) * (al->bound
            new_al->bound.rmax.x = ((FLOAT)col_ptr/(FLOAT)PALLOC_RES) * (al->bou
            break;
        case 1:
```

```
                              new_al->bound.rmin.y = ((FLOAT)start/(FLOAT)PALLOC_RES) * (al->bou
                              new_al->bound.rmax.y = ((FLOAT)col_ptr/(FLOAT)PALLOC_RES) * (al->b
                              break;
                    case 2:
                              new_al->bound.rmin.z = ((FLOAT)start/(FLOAT)PALLOC_RES) * (al->bou
                              new_al->bound.rmax.z = ((FLOAT)col_ptr/(FLOAT)PALLOC_RES) * (al->b
                              break;
                    }
               start=col_ptr;

/* Insert into list */
               new_al->next = al->next;
               al->next = new_al;
               }

/* Wipe out one partition to avoid duplicates*/
       new_al = al->next;
       *al = *new_al;
       al->next = new_al->next;
       Delete(new_al);

/* Mark as done! */
       al->done = TRUE;
#endif /* ORB */
}

/* Generate our own counts along an axis */
void
GenLocalCounts(prob,al, axis, reallocate)
 PProblem prob;
 PAllocStruct al;
 int axis;
 int reallocate;
{
 PAllocStruct pal;
 int j;
 PShape s;
 PCartData cd;
 PParticle vector[VECTOR_LENGTH];

cd = (PCartData) prob->data;
 prob->palloc.alloc_list = al;
 prob->palloc.alloc_dir = axis;

for(pal = al; pal != NULL; pal= pal->next)
        {
         for(j=0; j<PALLOC_RES; j++)
            {
             pal->count[j] = 0;
            }
        }

TotWeight = 0;
switch(reallocate)
    {
        /* Initial allocation - simply partition */
     case NEW_ALLOCATE:
             s = NewBox(NULL, &al->bound, NULL);
             BlockFillShape(cd->shapes, s, &cd->c_size, &cd->hc_size, prob, CountCell);
             Delete(s);
         break;
     case REALLOCATE:
             /* On reallocation - simply iterate particles and cells */
             VectorIterateContainer(cd->particles, PART_GROUP, (void **)vector, VECTOR_LENGTH, pr
             IterateContainer(cd->cells, CELL_GROUP, prob, WeightCell);
         break;
                                      21
```

```
    #ifdef NOTDONE
        case SPHC_ALLOCATE:
            ReadAndCountSPHCParticles(prob);
            break;
    #endif
        }
    /* Do a global count of particles along one direction */
    prob->TotWeight= TotWeight;
} int
CountCell(udata, s, p)
 void *udata;
 PShape s;
 PPoint p;
{
 AddToCounts((PProblem) udata, p, CELL_WEIGHT);
 return(1);
} int
WeightCell(udata, p)
 void *udata;
 void *p;
{
 PCartCell c;
 c = (PCartCell) p;

AddToCounts((PProblem) udata, &c->p, CELL_WEIGHT);
 return(1);
} int
WeightParticles(pprob, ppart, n)
 void *pprob;
 void **ppart;
 int n;
{
 int i;
 PParticle p;

for(i=0; i<n; i++)
        {
        p = (PParticle) ppart[i];
        AddToCounts((PProblem) pprob, &p->p, PART_WEIGHT);
        }
 return(TRUE);
} void
AddToCounts(prob, p, weight)
 PProblem prob;
 PPoint p;
 int weight;
{
 int k;
 PAllocStruct al;

TotWeight += weight;

/* Match against the lists */
 for(al=prob->palloc.alloc_list; al!= NULL; al=al->next)
        {
        if(PointInRect(p, &al->bound))
            {
            switch(prob->palloc.alloc_dir)
```

22

```
                {
                case 0:
                        k = (p->x - al->bound.rmin.x) * PALLOC_RES /
                                (al->bound.rmax.x - al->bound.rmin.x);
                        break;
                case 1:
                        k = (p->y - al->bound.rmin.y) * PALLOC_RES /
                                (al->bound.rmax.y - al->bound.rmin.y);
                        break;
                case 2: /* Z */
                        k = (p->z - al->bound.rmin.z) * PALLOC_RES /
                                (al->bound.rmax.z - al->bound.rmin.z);
                        break;
                }

/* Some machines round a little funny here */
                if(k >= PALLOC_RES)
                        k = PALLOC_RES-1;

al->count[k] += weight;
        }
} void
StartWeightTimer(prob)
 PProblem prob;
{
 /* Reset our timer */
 prob->palloc.start_time = GetCurTime();
} void
StopWeightTimer(prob)
 PProblem prob;
{
 long t;
 /* Normalize times to 100ths of a second   */
 t=GetCurTime();

/* Check for a possible clock rollover */
 if(t >= prob->palloc.start_time)
        /* Calculate accumulated time in hundredths of a second */
        prob->palloc.accum_time += t - prob->palloc.start_time;
 else
        prob->palloc.accum_time += t;           /* This is an approximation */
} ifdef UTSNAME
 static int first_weight_done;
endif void
SendWeights(prob)
 PProblem prob;
{
 int zero=0;
 long t;

#ifdef UTSNAME
 struct utsname u;
 if(NProc <= 1)
        return;

if(!first_weight_done)
```

```c
                {
                uname(&u);
                prob->palloc.accum_time = 1000L;
                prob->stats.NActive = (long) GetConfigInt("Weights",u.nodename,1000,ConfigFile);
                }
        else
endif /* Don't bother sending to ourselves */
    if(NProc <= 1 ||
                (prob->step - prob->palloc.last_loadbal) < prob->palloc.bal_step_threshold)
        return;

/* Send the weights to everyone */
    MP_Pack(NULL, &prob->palloc.accum_time, 1, MP_LONG, 1);
    prob->palloc.pweights[Rank] = prob->palloc.accum_time;

/* Also send the number of particles so we can weight reallocation */
    t = (long) prob->TotWeight + 10L; /* Add a little for overhead */
    prob->palloc.weights[Rank] = t;

MP_Pack(NULL, &t, 1, MP_LONG, 1);
    MP_BSendBuf(NULL, NULL, NProc, WEIGHT_TAG);
} void
GetWeightsAndLoadBalance(prob, ret_tot_weight)
 PProblem prob;
 long *ret_tot_weight;
{
 long tot_time, tot_weight, avg_weight;
 long ptot_weight;
 FLOAT var_weight;
 long tot_part, avg_part;
 FLOAT havg_weight;    /* Harmonic avg */
 long std_dev;
 FLOAT temp;
 int i;

JustBalanced = FALSE;
 /* Don't bother when we have one proc */
 if(NProc <= 1 ||
                ((prob->step - prob->palloc.last_loadbal) < prob->palloc.bal_step_threshold
#ifdef UTSNAME
        && first_weight_done
#endif
        ))
        {
        *ret_tot_weight = 0l;
        for(i=0; i<NProc; i++)
                {
                /* NOTE - this is the default load balancing */
                prob->palloc.weights[i] = 1000L;
                prob->palloc.pweights[i] = 1000L;
                *ret_tot_weight += prob->palloc.pweights[i];
                }
        return;
        } tot_time=0L;
tot_part=0L;
havg_weight = 0.0;
/* Gather weights from all processors */
for(i=0; i<NProc; i++)
        {
        if( i != Rank)
```

```
            {
            MP_BRecvBuf(NULL, i, WEIGHT_TAG);
            MP_Unpack(NULL, &prob->palloc.pweights[i], 1, MP_LONG, 1);
            /* Get the number of particles into the weight variable */
            MP_Unpack(NULL, &prob->palloc.weights[i], 1, MP_LONG, 1);
            }
        tot_time += prob->palloc.pweights[i];
        tot_part += prob->palloc.weights[i];
        havg_weight += (1.0 / (FLOAT) prob->palloc.pweights[i]);
        } avg_weight = tot_time / NProc;
    /* Compute the harmonic avg of the times */
    havg_weight = (FLOAT) NProc / havg_weight;

avg_part = tot_part / NProc;
    ptot_weight = 0L;
    var_weight = 0.0;  /* Variance */

/* Calculate the standard deviation */
    for(i=0; i<NProc; i++)
        {
        temp = (FLOAT) prob->palloc.pweights[i] - (FLOAT) avg_weight;
        var_weight += temp * temp;

/* Calculate particle adjusted weight - to use for allocation */
        /* Note - improved allocation algorithm - converges faster */
#ifdef NOTDEF
        prob->palloc.weights[i] = (long) (
                        (FLOAT)prob->palloc.weights[i] +
                        (FLOAT)((((FLOAT)avg_weight - (FLOAT)prob->palloc.pweights[i])*
                    (FLOAT)avg_part)/ (FLOAT)prob->palloc.pweights[i]));
#endif
        prob->palloc.weights[i] = (long) ( havg_weight * (FLOAT)prob->palloc.weights[i]
                        / (FLOAT) prob->palloc.pweights[i]);
        prob->palloc.weights[i] = MAX(10L, prob->palloc.weights[i]);
        ptot_weight += prob->palloc.weights[i];
        } ifdef UTSNAME
    if(!first_weight_done)
        {
        first_weight_done = TRUE;
        *ret_tot_weight = ptot_weight;
        return;
        }
endif /* Standard deviation criterion  - note since the processor
     *    weights are normalized, we need only calculate std_dev/avg_weight */
    std_dev = (long) sqrt (var_weight)  * 1000L / avg_weight ;

if(Rank == 0)
        PartitionDebug("Avg Weight=%ld h_avg=%f tot_weight=%ld var=%f dev=%ld step_dif=%d\n"
            havg_weight, tot_weight, var_weight, std_dev, (prob->step-prob->palloc.last_

/* Reallocate processors  - allow at least bal_step_threshold timesteps between */
    if((avg_weight > 500L && std_dev > prob->palloc.dev_threshold &&
                (prob->step - prob->palloc.last_loadbal) >= prob->palloc.bal_step_threshold)
        /* Also allow for forced loadbalance every force_bal_step steps */
        || (prob->step - prob->palloc.last_loadbal > prob->palloc.force_bal_step))
        {
        if(Rank == 0)
            {
            MP_Log("Load Balance - standard deviation of weights is %ld\n", std_dev);
```

```c
                for(i=0; i<NProc; i++)
                        PartitionDebug("Weight[%d]=%ld  AllocWeight=%ld\n", i, prob->palloc.
                                prob->palloc.weights[i]);
                }

Repartition(prob);

/* Note - migration is part of Repartition() above */
        /* Reset accumulated time so we can load balance again later */
#ifdef NOTDEF /* This was an idea I had about maintaining some history - */
        prob->palloc.accum_time = MAX(10L, prob->palloc.accum_time/10);
#endif
        prob->palloc.accum_time = 10L;
        prob->palloc.last_loadbal = prob->step;
        JustBalanced = TRUE;
        }

*ret_tot_weight = ptot_weight;

} long
GetCurTime()
{
 long t;
 struct timeval tv;
 struct timezone tz;
 /* Keep start time to avoid clock rollover problems */
 static long start_t;

#ifdef OLD
 /* Old method - use clock time */
 t=clock()/(CLOCKS_PER_SEC/100L);
endif /* Try using real wall clock time */
 gettimeofday(&tv, &tz);
 if(!start_t)
        start_t = tv.tv_sec;
 t = 100L * (long) (tv.tv_sec - start_t) + ((long) tv.tv_usec/ 10000L);

return(t);
}

/* An exact integer cube root */
int
cube_root(n)
 int n;
{
 if (n < 8)
        return(1);
 if (n < 27)
        return(2);
 if (n < 64)
        return(3);
 if (n < 125)
        return(4);
 if (n < 216)
        return(5);
 if (n < 343)
        return(6);
 if (n < 512)
        return(7);
 if (n < 729)
        return(8);
```

```
    if (n < 1000)
        return(9);
    if (n < 1331)
        return(10);
    if (n < 1728)
        return(11);
    if (n < 2197)
        return(12);
    if (n < 2744)
        return(13);
    if (n < 3375)
        return(14);
    if (n < 4096)
        return(15);
    if (n < 4913)
        return(16);
    if (n < 5832)
        return(17);
    if (n < 6859)
        return(18);
    if (n < 8000)
        return(19);
    return(20);
} void
Repartition(prob)
 PProblem prob;
{
 PCartData cd;

cd = (PCartData) prob->data;

/* Don't repartition other types */
 if(prob->partition_type != PARTITION_SMITH_TYPE)
        return;

/* First partition problem */
 PartitionProblem(prob, NProc, &prob->global_bounds, prob->partition_type,
        &cd->c_size, REALLOCATE);

/* Then migrate everyone */
 Migrate(prob, cd);
}
```

What is claimed is:

1. A process for dynamic spatial allocation of computer tasks to a set of N parallel processors, where N is an integer and wherein each parallel processor has a positive weight W(i) that characterizes its relative data processing speed, wherein said process comprises the steps of: defining each computer task in spatial dimensions (D);

creating an allocation structure of spatial boundaries composed of $D\sqrt{N}$ columns of processors where:

D=the spatial dimensions of the proposed computer task; and

N=the number of parallel processors;

estimating a set of column weights C(5) for each column of processors in the allocation structure where each column weight C(5)=a sum of all processor weight W(i) of processors in each column;

using the spatial dimensions (D) of each computer task to generate a proposed computing load for each processor in the allocation structure;

using the proposed computing load to assign all tasks to least loaded processors; and repeating all the steps in the process as subsequent computer tasks are sequentially received.

2. A system for dynamic spatial allocation of computer tasks to a set of N parallel processors, where N is an integer, and wherein each parallel processor has a positive weight W(i) that characterizes its relative data processing speed, wherein said system comprises:

a means for defining each computer task in spatial dimensions (D);

a means for creating an allocation structure of spatial boundaries composed of $D\sqrt{N}$ columns of processors where:

D=the spatial dimensions of the proposed computer task; and

N=the number of parallel processors;

a means for estimating a set of column weights C(5) for each column of processors in the allocation structure where each column weight C(5)=a sum of all processor weights W(i) of processors in each column;

a means for using the spatial dimensions (D) of each computer task to generate a proposed computing load for each processor in the allocation structure;

a means for using the proposed computing load to assign all tasks to least loaded processors; and a means for repeating all the steps in the process as subsequent computer tasks are sequentially received.

* * * * *